Patented Jan. 20, 1931

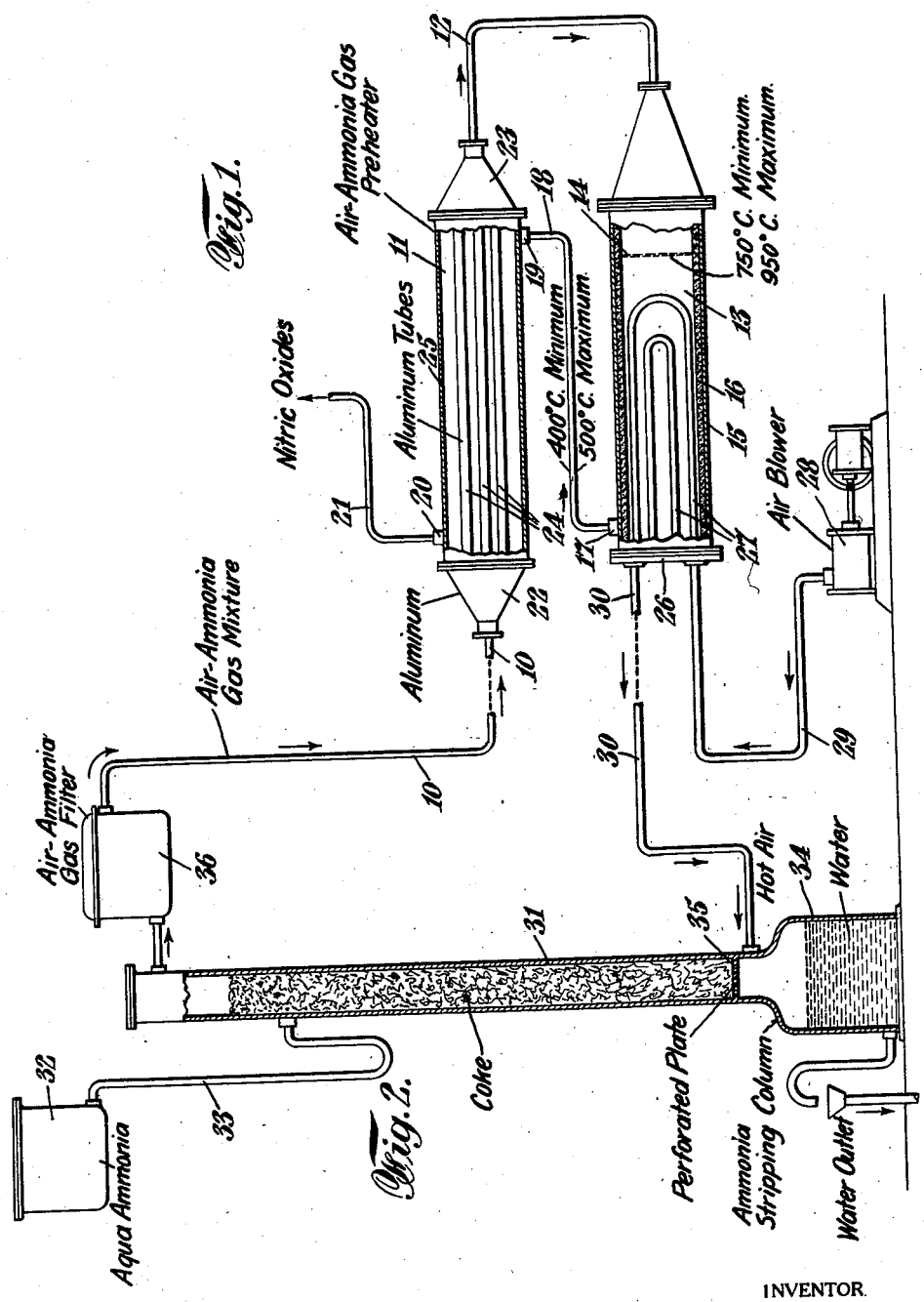

1,789,580

UNITED STATES PATENT OFFICE

FREDRIK W. DE JAHN, OF NEW YORK, N. Y., ASSIGNOR TO FRANK A. BOWER, OF BAYSIDE, NEW YORK

SYSTEM AND APPARATUS FOR MANUFACTURING NITROGEN OXIDE

Application filed June 15, 1928. Serial No. 285,576.

This invention relates to the manufacture of nitrogen oxides and more particularly to the manufacture of nitrogen oxides by oxidation of ammonia gas mixtures.

The oxidation of ammonia gas mixtures takes place at high degrees of temperature involving a large amount of heat and it is advantageous to lower the temperature of the gases immediately after oxidation.

The object of this invention is to provide a simple system and durable apparatus for oxidation of the ammonia gas mixtures and the immediate reduction of the temperature of the resulting gases, utilizing the reduced temperature of the gases to pre-heat the air-ammonia gas mixture before it enters the oxidizing apparatus.

Further objects and advantages of the invention will be apparent from the following specification and drawings, in which—

Fig. 1 is a diagrammatic elevational view parts in section showing the pre-heater and oxidizing apparatus, and Fig. 2 is a diagrammatic elevational view showing one form of apparatus for the manufacture of air, ammonia gas mixture.

In the apparatus illustrated in Fig. 1, the air, ammonia gas mixture is supplied through pipe 10 to the left hand end of the pre-heater designated generally at 11. The air, ammonia gas mixture after being pre-heated passes through pipe 12 into the right hand end of the oxidizing chamber of the oxidizing apparatus designated generally at 13 and against platinum gauze 14, forming a diaphragm across the oxidizing chamber adjacent its entrance end. The oxidation taking place in the vicinity of the gauze 14 creates a large amount of heat and therefore the generally cylindrical shell 15 is lined with refractory material 16, preferably of material having high insulating properties to withstand the heat. The hot gases from the gauze 14 after considerable reduction of temperature within the oxidizing apparatus 13, pass outwardly through the opening 17 to the pipe 18 connected to the inlet 19 of the pre-heater 11. The gases pass through the pre-heater outwardly through the outlet 20 to the pipe 21 connected to the nitric acid absorption apparatus (not shown).

The pre-heater 11 is provided with headers 22 and 23 having diaphragms connected to tubes 24 through which the air, ammonia gas mixture passes. These tubes are encased in a generally cylindrical sheet metal shell 25 forming a heating chamber surrounding the tubes 24 for the circulation of the hot gases which pre-heats the air, ammonia mixture passing through the tubes 24.

The material used in the construction of the headers, tubes and other portions of the pre-heater contacting with the air, ammonia gas mixture is preferably aluminum or other material not attacked by the air, ammonia gas mixture.

It is essential to provide means for lowering of the temperature of the hot gases from the gauze 14 in the most efficient manner and before they enter the pre-heater 11 as the tubes 24 and surrounding portions cannot withstand the high temperature of the gases from the gauze 14 because of the low melting point of the material from which they are constructed. It is also advantageous to reduce the temperature of the gases immediately upon their formation for the more efficient operation of the system.

For this purpose the end of the shell 15 of the oxidizing apparatus is provided with a header 26 and a diaphragm connected to U-shaped pipes 27 adapted to carry and circulate air or other gas into the oxidizing space close to the gauze 14. The air from the blower 28 enters the oxidizing apparatus through the pipe 29, circulating through the U-shaped pipes 27 and then out through pipe 30.

The hot air or gas from pipe 30 may be utilized for any desired purpose.

Fig. 2 illustrates one method of forming the air, ammonia gas mixture by utilizing the hot air from the pipe 30. The pipe 30 is connected to the lower end of an ammonia stripping column 31 so that the heated air from the oxidizing apparatus passes into the stripping column.

Aqua ammonia from supply tank 32 is permitted to flow by gravity through pipe 33 to the top of the stripping column, the body portion of which is packed with coke. The hot air rises removing and mixing with the ammonia, the water flowing downwardly to the base 34 of the column through perforated plate 35. The mixture of air, ammonia gas, after passing from the stripping column 31, is filtered by filter 36 to which is connected pipe 10 thereafter passing through the pre-heater 11 to be preheated before passing into the oxidizing apparatus 13.

In the apparatus of this invention the extremely hot freshly formed oxides are immediately cooled sufficiently to avoid the effect of hot temperature and breaking down the compounds formed by the burning and to avoid too high temperatures of the gases entering the pre-heater. This maintains or increases the final yield of the desired oxide. At the same time the rapid cooling minimizes the high temperature effects and avoids the complications necessary in handling these extremely hot gases which ignite and burn in the oxidizing chamber at a temperature ranging from approximately 750° C. to 950° C. and are quickly cooled in the oxidizing apparatus to a temperature ranging from approximately 400° C. to 500° C. as they pass into the pre-heater which is insufficient temperature to damage the tubes and surrounding portions of the pre-heater.

I claim:

1. In apparatus for forming nitrogen oxides, the combination with a source supplying an air-ammonia gas mixture, of pre-heating means therefor, combining means for said mixture comprising a chamber, said combining means forming nitrogen oxides at high temperature, means for cooling said oxides with said combining means and immediately upon their formation, and means for passing said formed oxides through said pre-heating means.

2. In apparatus for forming nitrogen oxides, the combination with a source supplying an air-ammonia gas mixture, of pre-heating means for said mixture, combining means therefor comprising a chamber, said combining means forming nitrogen oxides, means for reducing the temperature of said oxides within said combining means and immediately upon their formation, and means for directly passing said formed oxides after reduction of temperature into said pre-heating means.

3. In apparatus for forming nitrogen oxides, the combination with a source supplying an air-ammonia gas mixture of a pre-heater for said mixture comprising a chamber containing tubes through which said gas mixture passes, oxidizing apparatus for forming nitrogen oxides connected to said pre-heater and connecting means between said oxidizing apparatus and said preheater for directly conducting said formed oxides into said pre-heater to circulate around said tubes to heat said gas mixture as it passes through said tubes.

4. In apparatus for forming nitrogen oxides, the combination with a source supplying an air-ammonia gas mixture of a pre-heater for said mixture comprising a chamber containing tubes through which said gas mixture passes, oxidizing apparatus for forming nitrogen oxides connected to said pre-heater, coils within said oxidizing apparatus through which a gas circulates for reducing the temperature of said oxides immediately upon their formation, and means between said oxidizing apparatus and said pre-heater for conducting said formed oxides into said pre-heater to circulate around said tubes to heat said gas mixture as it passes through said tubes.

5. In apparatus for forming nitrogen oxides, the combination with apparatus for forming an air-ammonia gas mixture of a pre-heater for said gas mixture, connecting means between said gas forming apparatus and said pre-heater oxidizing apparatus for forming nitrogen oxides connected to said pre-heater, coils within said oxidizing apparatus through which a gas passes for reducing the temperature of said formed oxides immediately upon their formation, connecting means between said oxidizing apparatus and said pre-heater for conducting said formed oxides after reducing their temperature by gas passing through said coils into said pre-heater to heat said gas mixture from said gas forming apparatus before said gas mixture passes into said oxidizing apparatus, and connecting means between said coils and said gas forming apparatus for conducting the heated gases from said coils into said gas forming apparatus.

FREDRIK W. de JAHN.

CERTIFICATE OF CORRECTION.

Patent No. 1,789,580.                                                          Granted January 20, 1931, to

FREDRIK W. de JAHN.

It is hereby certified that error appears in the printed specification of the above numbered patent requiring correction as follows: Page 2, line 40, claim 1, for the word "with" read within; and that the said Letters Patent should be read with this correction therein that the same may conform to the record of the case in the Patent Office.

Signed and sealed this 24th day of February, A. D. 1931.

(Seal)                                                    M. J. Moore,
                                                           Acting Commissioner of Patents.